(12) United States Patent
Ono et al.

(10) Patent No.: US 7,076,425 B2
(45) Date of Patent: Jul. 11, 2006

(54) VOICE RECOGNITION DEVICE WITH LARGER WEIGHTS ASSIGNED TO DISPLAYED WORDS OF RECOGNITION VOCABULARY

(75) Inventors: Takeshi Ono, Tokyo (JP); Okihiko Nakayama, Kanagawa-ken (JP)

(73) Assignee: Nissam Motor Co., Ltd., Kanagawa-Ken (JP)

( * ) Notice: Subject to any disclaimer, the term of this patent is extended or adjusted under 35 U.S.C. 154(b) by 852 days.

(21) Appl. No.: 10/087,980

(22) Filed: Mar. 5, 2002

(65) Prior Publication Data

US 2002/0133338 A1 Sep. 19, 2002

(30) Foreign Application Priority Data

Mar. 19, 2001 (JP) .......................... P2001-077910

(51) Int. Cl.
*G10L 15/22* (2006.01)
(52) U.S. Cl. .................. 704/252; 704/275; 704/276
(58) Field of Classification Search ................ 704/252, 704/275, 276, 251, 200
See application file for complete search history.

(56) References Cited

U.S. PATENT DOCUMENTS 5,329,609 A * 7/1994 Sanada et al. .............. 704/251
5,950,160 A * 9/1999 Rozak ........................ 704/252
6,192,343 B1 * 2/2001 Morgan et al. ............. 704/275
6,374,218 B1 * 4/2002 Kimura et al. .............. 704/251

FOREIGN PATENT DOCUMENTS

| JP | 06-337695 | 12/1994 |
| JP | 11-052984 | 2/1999 |
| JP | 2000-193479 | 7/2000 |
| JP | 2000-203357 | 7/2000 |
| JP | 2000-220576 | 8/2000 |
| JP | 2002-041078 | * 2/2002 |

* cited by examiner

*Primary Examiner*—Donald L. Storm
(74) *Attorney, Agent, or Firm*—McDermott Will & Emery LLP (57) ABSTRACT

A voice recognition device is provided to improve a recognition rate for objective recognition terms on display. The device includes a voice pickup unit for picking up user's voices, a storing unit for storing a plurality of objective recognition terms, a display unit for displaying a designated number of objective recognition terms stored in the storing unit and a voice recognition unit. The voice recognition unit has a weighting section for weighting the objective recognition terms on display more heavily than those not on display, and a calculating section for calculating respective degrees of agreement between the objective recognition terms after the objective recognition terms are weighted and the user's voices are picked up by the voice pickup unit. Based on this calculating result of the degrees of agreement, the voice recognition device recognize the user's voices.

6 Claims, 10 Drawing Sheets

VOICE RECOGNITION DEVICE WITH LARGER WEIGHTS ASSIGNED TO DISPLAYED WORDS OF RECOGNITION VOCABULARY

BACKGROUND OF THE INVENTION

1. Field of the Invention

The present invention relates to a voice recognition device which can recognize voices of a user as words.

2. Description of Related Art

In an earlier technology, there is known a voice recognition device which recognizes the user's voices to perform the input operations of various electronic installations, such as navigation system for automobile (see Japanese Patent Application Laid-open Nos. 2000-193479 and 2000-203357).

The voice recognition device of this kind stores words (terminology) required to accomplish the above input operations of various electronic installations in advance. Note, such words will be referred to "objective recognition terms", hereinafter. In operation, the above device collates these objective recognition terms with various words vocalized by an user actually and further detects (or calculates) the degrees of agreement between the words that the user vocalized and the objective recognition terms stored in the device. Then, by comparing the so-detected degrees of agreement with each other, the objective recognition term having the largest degree of agreement is recognized as a word that the user has vocalized. Under such a situation, since "effective" words that the user is permitted to use for the input operations of various electronic installations are limited to the above-mentioned objective recognition terms, it is necessary for the user to memorize these objective recognition terms in advance of activating the electronic installations and/or vocalize on confirmation of operation manuals for the installations.

In order to lighten the user's burden and improve the recognition rate between the user's voices and the objective recognition terms, the conventional voice recognition device employs a countermeasure where the objective recognition terms that the user is permitted to use for the input operations or the objective recognition terms that the user's input (vocalization) is expected, are displayed on a monitor in advance.

In the application of the voice recognition device on a navigation system for vehicle, however, the monitor cannot display all of the objective recognition terms (e.g. names of regions, names of stations) of the user's destination at a time because of their numerous words. Therefore, when collating numerous objective recognition terms, such as destinations, with various words vocalized by the user thereby to calculate the degrees of agreement, there are arisen problems of deteriorating a recognition ratio and also wasting time for calculating the degrees of agreement.

Meanwhile, due to the difference among individuals in terms of nature of the user's voice, the user's way of speaking, etc. and the difference in surrounding atmosphere, such as presence of noise, there is a case of impossibility to judge whether one objective recognition term agrees with the user's voice, causing a misidentification. Additionally, if the voice recognition device is unable to recognize a term (words) that the user has uttered despite that such a term is being displayed on the monitor, then a sense of incompatibility may arise in the user's mind, in comparison with a case that the same term is not displayed on the monitor.

SUMMARY OF THE INVENTION

Under the above circumstance, it is an object of the present invention to improve a recognition rate for the objective recognition terms displayed on the monitor in the voice recognition device.

According to the invention, the above-mentioned object is accomplished by a voice recognition device comprising:

a voice pickup unit configured to pick up voices of a user;

a memory unit configured to store a plurality of objective recognition terms therein;

a display unit configured to display a predetermined number of objective recognition terms which are included in the plural objective recognition terms stored in the memory unit;

a weighting unit configured to weight the objective recognition terms on the display unit with respective weighted values each larger than weighted values of the other objective recognition terms that are not displayed on the display unit, the weighted values representing the objective recognition terms' easiness to be displayed on the display unit; and a calculating unit configured to calculate respective degrees of agreement between the objective recognition terms after being weighted by the weighting unit and the user's voices picked up from the voice pickup unit, wherein the user's voices are recognized on ground of a result of calculation of the degrees of agreement obtained by calculating unit.

DESCRIPTION OF THE PREFERRED EMBODIMENT

Embodiments of the present invention will be described below, with reference to accompanying drawings.

1ST. EMBODIMENT

Figure 1:
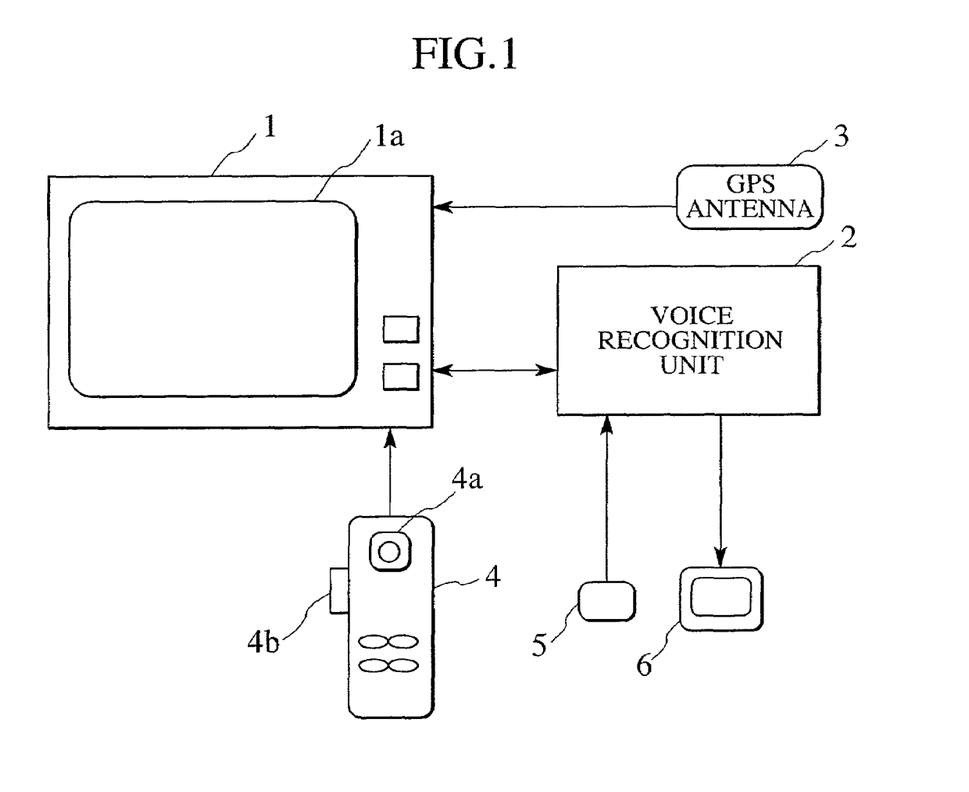
FIG. 1 is a structural view showing the voice recognition device in accordance with the first embodiment of the present invention.

FIG. 1 shows the structure of the voice recognition device in accordance with the first embodiment of the invention. Connected to a navigation unit 1 is a voice recognition unit 2 that carries out an input operation of the navigation unit 1 by means of user's voices. In operation, the navigation unit 1 detects the place where a user's vehicle is at present and further searches for a guidance route up to a user's destination. Both of the present place and the guidance route are displayed on a monitor 1a in the navigation unit 1 while being together laid on a road map in the circumference of the present place. A GPS antenna 3 for detecting the present position by a satellite navigation and a navigation remote controller 4 for manipulating the navigation unit 1 manually resent place are together connected to the navigation unit 1. The navigation remote controller 4 is provided with a joy stick 4a for manipulating display contents on the monitor 1a and a voicing/cancel switch 4b for user's indications to start/end the vocalization and also cancel the same. A microphone 5 for picking the user's voices up and a speaker 6 for phonetic responses against the user are respectively connected to the voice recognition unit 2.

Figure 2:
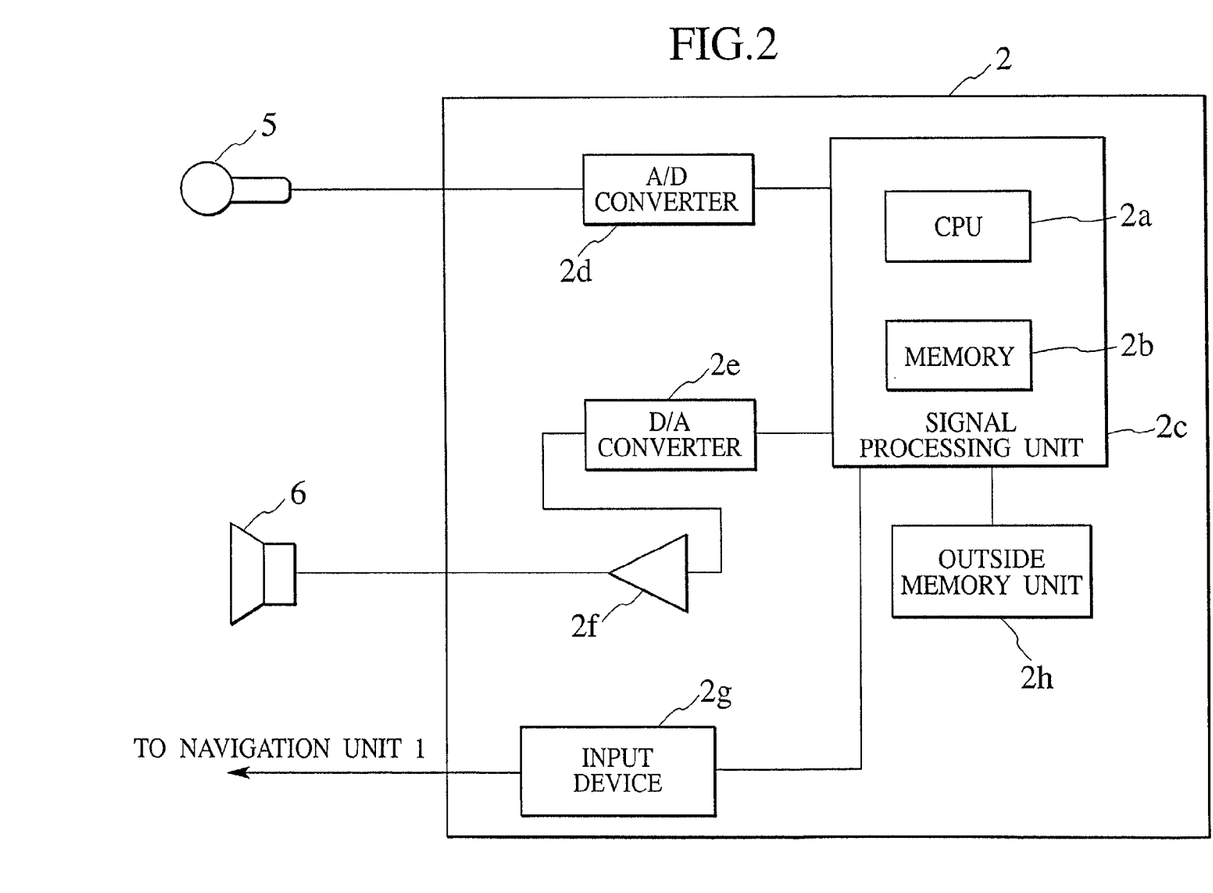
FIG. 2 is a view showing the details of a voice recognition unit of FIG. 1.

FIG. 2 shows the details of the voice recognition unit 2 of FIG. 1. Besides a signal processing unit 2c formed by a CPU 2a and a memory 2b, the voice recognition unit 2 further includes an A/D converter 2d for converting analog-voice input signals from the microphone 5 into digital signals, a D/A converter 2e for converting digital-voice output signals into analog signals, an amplifier 2f for amplifying the analog-voice input signals, an input/output device 2g for data-communication with the navigation unit 1, an outside memory unit 2h for storing the objective recognition terms, and so on.

Figure 3:
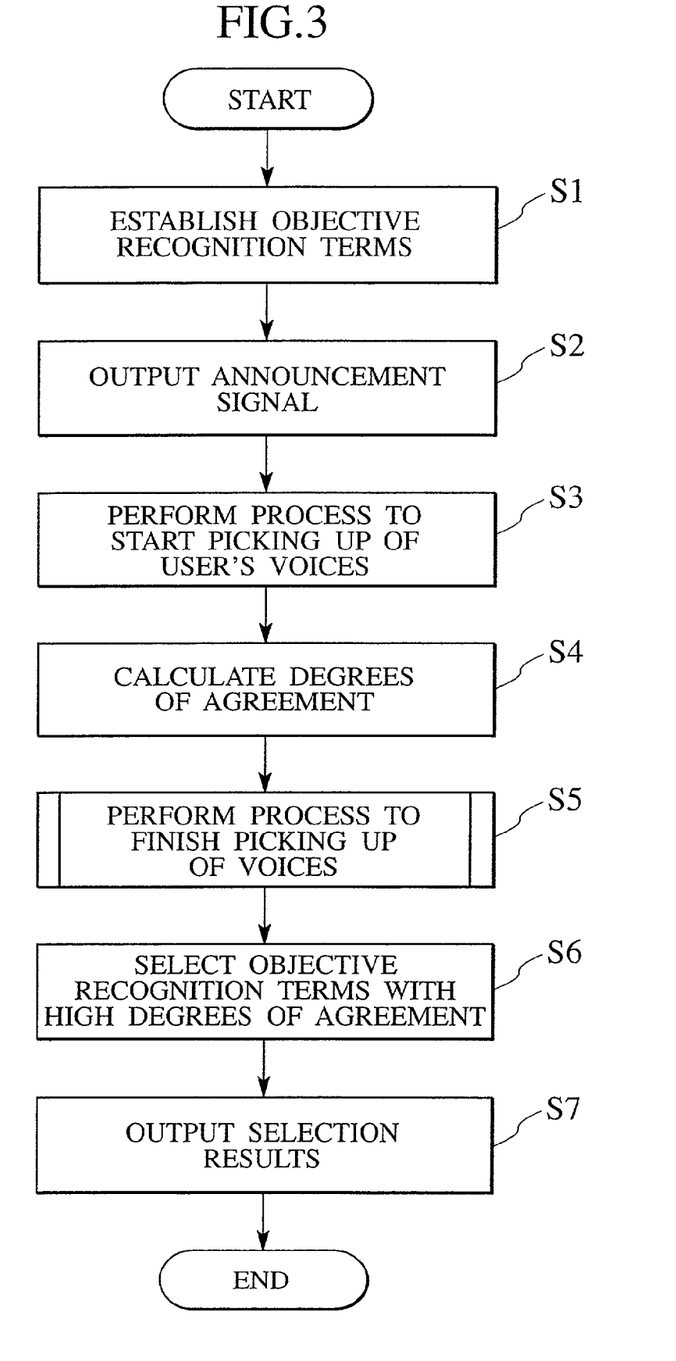
FIG. 3 is a flow chart showing a voice recognition program of the first embodiment of the invention.

FIG. 3 is a flow chart showing a voice recognition program in accordance with the first embodiment of the invention. This voice recognition program is stored in the memory 2b in the voice recognition unit 2. When the user pushes the voicing/cancel switch 4b on the navigation remote controller 4 for long, then the navigation unit 1 transmits a voicing-start signal to the signal processing unit 2c of the voice recognition unit 2 through the input/output device 2g. On receipt of the voicing-start signal, the CPU 2a of the signal processing unit 2c begins to execute the processing program of FIG. 3.

Figure 4:
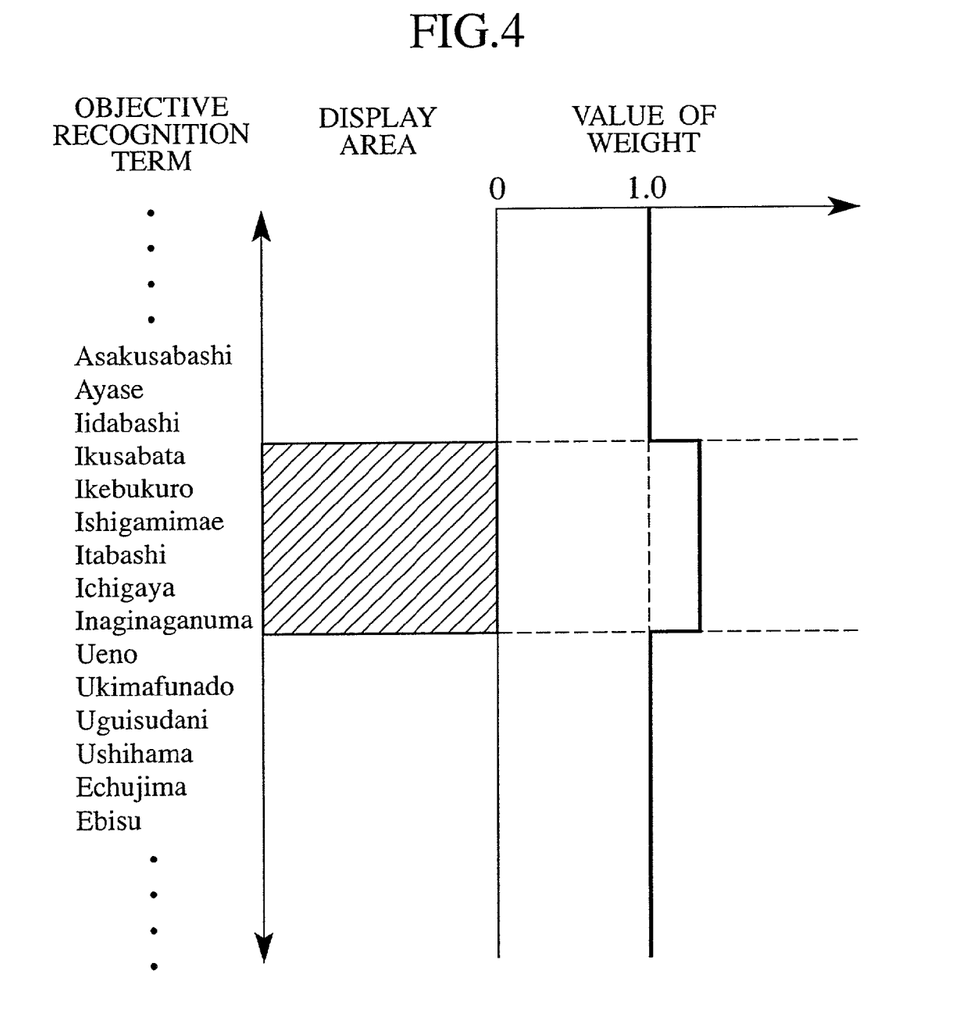
FIG. 4 is a diagram for explanation of a method of weighting objective recognition terms of the first embodiment of the invention.
Figure 5:
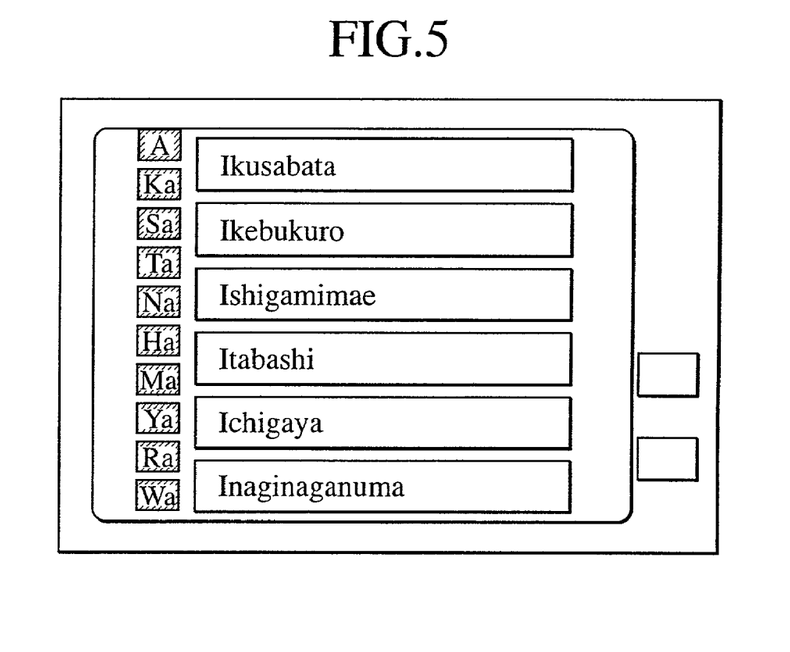
FIG. 5 is a view showing one example of displaying the objective recognition terms in a range of display.

In the first embodiment, we now describe the voice recognition device with reference to an example where "Itabashi" station in the Japanese Railways Co. Ltd. is established as a destination by a dialogue between a user and the device. In this example, it is assumed that there are previously stored various objective recognition terms as the destinations, for example, regions, stations, etc. as shown in FIG. 4, in the navigation unit 1. Displayed on the monitor 1a by the user's manipulation of a joy stick 4a of the remote controller 4 is a voluntary range which includes the objective recognition terms of a predetermined number as shown in FIG. 5. Note, the above voluntary range will be referred to "display area" hereinafter.

According to this embodiment, the objective recognition terms are stored in order of the Japanese syllabary for every sort in the destination (e.g. regions, stations) and therefore, the objective recognition terms in the display area are arranged on the monitor 1a in the order of the Japanese syllabary. Since the objective recognition terms are stored and displayed in the prescribed order, when performing a so-called "scroll-play" in order to change the contents in the display area, the user can know by intuition to which directions and to what extent the contents in the display area should be changed. Therefore, according to the embodiment, it is possible to improve the user's operability in specifying the destination. Note, in case of displaying the destinations in English, these objective recognition terms may be rearranged in alphabetical order.

If the user manipulates the joy stick 4a to change the objective recognition terms on the monitor 1a to the other ones, then the resultant objective recognition terms in a renewed display area are stored in the memory of the navigation unit 1. Next time, if there arises an opportunity to display the objective recognition terms of this kind on the monitor 1a again, the so-stored display area is read out to display the objective recognition terms in the same display area on the monitor 1a at first.

At step S1, it is executed to load the objective recognition terms to be used in the present "input" mode and further some objective recognition terms actually displayed on the monitor 1a from the navigation unit 1, so that the so-loaded terms are settled as the objective recognition term. Since the input mode for destinations is presently established in the shown example, there are loaded from the navigation unit 1 and continuously settled as the objective recognition terms, all of the objective recognition terms to be used for destinations, such as names of region and station names (see FIG. 4), and the objective recognition terms displayed on the monitor 1a (see FIG. 5). The settled objective recognition terms are stored in the outside memory unit 2h. At sequent step S2, in order to inform the user of the beginning of voice recognition operation, it is carried out to output an announcement signal, which has been previously stored in the outside memory unit 2h, to the speaker 6 via the D/A converter 2e and the amplifier 2f, thereby transmitting the information to the user.

At step S3, the pickup operation for voices that the user has uttered is started. In detail, the user's voices picked up by the microphone 5 are inputted to the signal processing unit 2c through the A/D converter 2d and successively stored in the outside memory unit 2h. The signal processing unit 2c always calculates the mean power of noises, which have been inputted by the microphone 5 and successively converted into the digital signals by the A/D converter 2d, unless the voicing/cancel switch 4b is manipulated. Once the voicing/cancel switch 4b is manipulated by the user, the unit 2c compares the latest mean power with the present instantaneous power. If a difference between the present instantaneous power and the latest mean power exceeds a predetermined value, then the unit 2c judges that the user has uttered any word and starts the input operation of the user's voices.

At next step S4, it is executed to collate the so-inputted vocal sectional parts with all of the objective recognition terms in the outside memory unit 2h thereby to start the calculation of degree of agreement. Note, the degree of agreement is a parameter representing how far the vocal sectional parts do resemble the stored objective recognition terms and is expressed in the form of a score. According to the shown embodiment, it is established that the larger the score becomes the higher the degree of agreement gets. Also noted, even while carrying out the calculation of degree of agreement at step S4, the pickup operation of the user's voices is maintained by the unit's parallel processing. If the instantaneous power of vocal signals decreases less than a designated value and further such a condition is maintained for a predetermined period, then it is judged that the user's vocalizing has been completed, whereby the pickup operation of the user's voices is ended (step S5).

At step S6, on completion of calculating the degrees (scores) of agreement, it is carried out to weight the degrees of agreement of the respective objective recognition terms and further extract some objective recognition terms exhibiting high degrees of agreement from all of the objective recognition terms. In detail, as shown in FIG. 4, all of the objective recognition terms displayed on the monitor 1a (terms in the display area) are weighted heavier than all objective recognition terms that are not displayed on the monitor 1a, which will be called "objective recognition terms outside the display area" hereinafter. In this example, the objective recognition terms outside the display area are respectively weighted with a weighted value of 1.0 each, while the objective recognition terms in the display area are respectively weighted with a weighted value more than 1.0 each. Next, it is executed to multiply the degrees of agreement of the respective objective recognition terms by the so-established weights. Continuously, the top-three high-ranking objective recognition terms exhibiting the first, second and third highest degrees (scores) of agreement are selected from the objective recognition terms after weighting thereby to output the so-selected objective recognition terms to the navigation unit 1 (step S7).

Note, of course, the respective weights on the objective recognition terms inside and outside the display area are not limited to only the above weighted values shown in the embodiment, but the objective recognition terms inside the display area have to have weighted values larger than those of the objective recognition terms outside the display area. Preferably, these weights are determined to be appropriate values by experiments.

Figure 6:
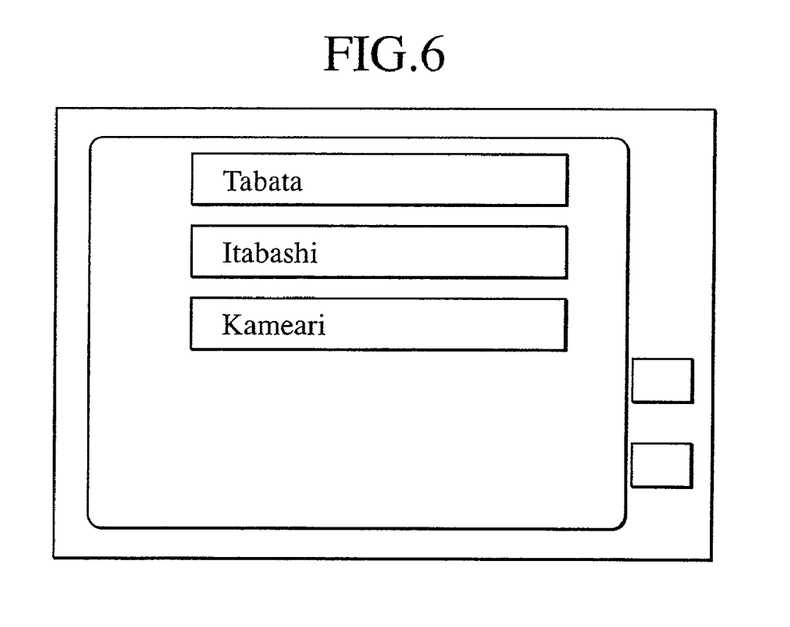
FIG. 6 is a view showing one example of displaying three high-ranking objective recognition terms after weighting.

As shown in FIG. 6, the navigation unit 1 displays three highest-ranking objective recognition terms received from the voice recognition unit 2, on the monitor 1a. In these objective recognition terms on display, a term "Itabashi" is one of the objective recognition terms displayed on the monitor 1a from the beginning, as shown in FIG. 5. It should be understood that the term "Itabashi" could obtain one position of three highest-ranking objective recognition terms because the same term has been heavily weighted as the objective recognition term inside the display area although the degree of agreement for the term "Itabashi" calculated at step S4 did not exhibit so large.

Figure 7:
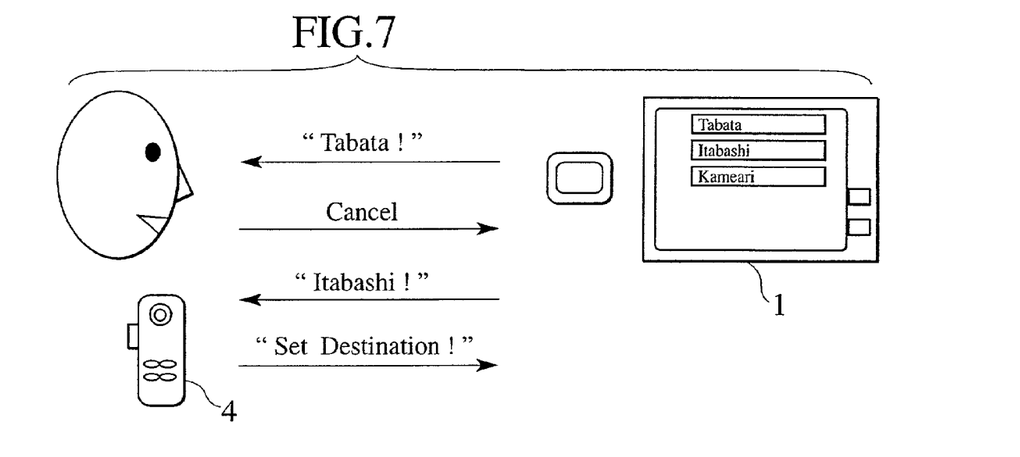
FIG. 7 is a view illustrating the order of selecting any one of objective recognition terms having high degrees of agreement.

FIG. 7 illustrates a course of selecting the user's destination (e.g. station "Itabashi") out of the three highest-ranking objective recognition terms displayed on the monitor 1a by the user's dialogue with the voice recognition device 1. At first, the signal processing unit 2c of the device 1 converts a term "Tabata" having the first highest degree of agreement into a phonetic signal and further transmits a vocal sound "Tabata" to the user by means of the speaker 6 through the D/A converter 2e and the amplifier 2f. Next, the user on receipt of this broadcasting pushes the voicing/cancel switch 4b for a moment upon judgment that the term "Tabata" is not the user's destination to be established obviously. Consequently, the navigation unit 1 detects the user's short manipulating of the voicing/cancel switch 4b and further transmits a cancel signal to the voice recognition unit 2.

On receipt of the cancel signal, the signal processing unit 2c of the voice recognition unit 2 converts the term "Itabashi" having the second highest degree of agreement into a phonetic signal and further transmits a vocal sound "Itabashi" to the user by means of the speaker 6 through the D/A converter 2e and the amplifier 2f. Hearing this broadcasting, the user utters a phrase of "Set Destination!" to settle the destination because the term "Itabashi" is nothing but the user's destination. Then, the signal processing unit 2c of the voice recognition unit 2 recognizes the vocal input of "Set Destination!" from the user and successively transmits the information of so-decided destination to the navigation unit 1. At last, the term "Itabashi" is established as the destination in the navigation unit 1.

In this way, according to the embodiment, when the user utters one objective recognition term displayed on the monitor 1a (FIG. 5), for example, the term "Itabashi" which is included in the group of objective recognition terms inside the display area, the probability is increased that the term "Itabashi" is included in the three highest-ranking objective recognition terms displayed on the monitor 1a (FIG. 6). Accordingly, it is possible to avoid the occurrence of a phenomenon that a user has a sense of incompatibility because a term (words) that the user has uttered is not recognized although the same term is actually displayed as one of the objective recognition terms inside the display area.

2ND. EMBODIMENT

We now describe another form of weighting the objective recognition terms against their degrees of agreement. Note, the structure of the voice recognition device embodying the second embodiment is similar to that of the first embodiment and therefore, the descriptions about the structure are eliminated. Additionally, besides the method of weighting the objective recognition terms, the operation of the second embodiment is similar to that of the first embodiment of the invention and the descriptions are eliminated as well.

Figure 8:
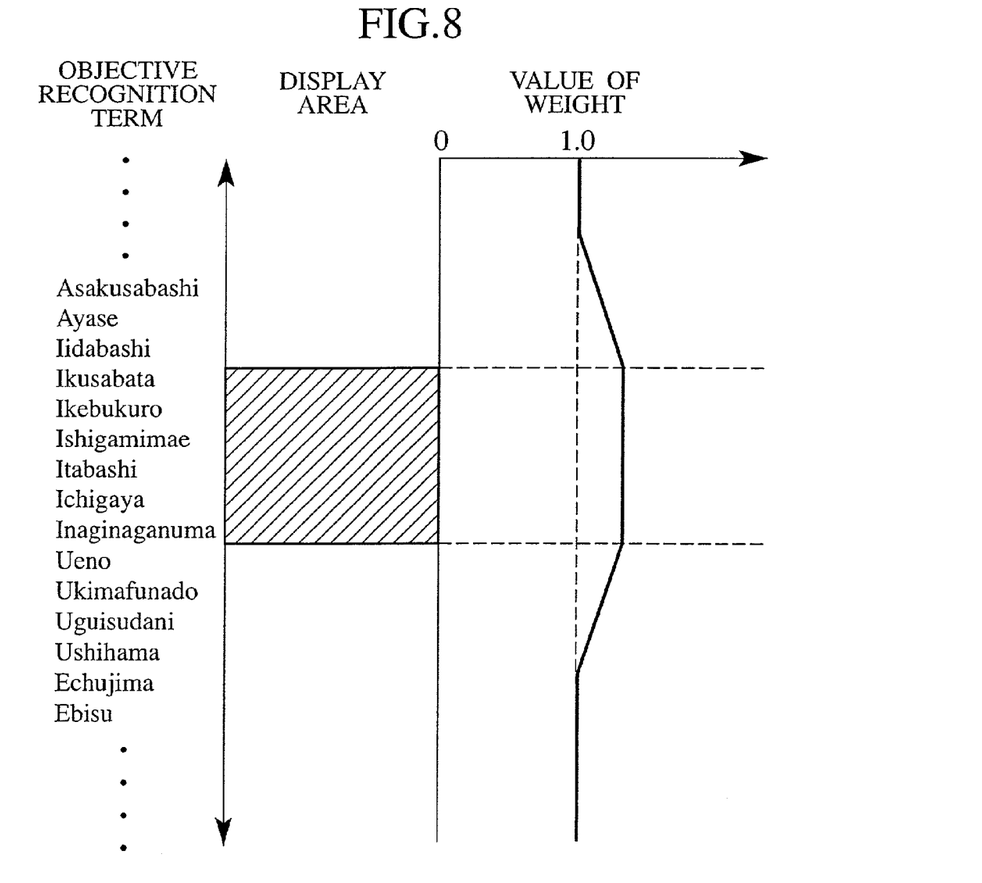
FIG. 8 is a diagram for explanation of the method of weighting objective recognition terms of the second embodiment of the invention.

According to the first embodiment mentioned before, as shown in FIG. 4, all of the objective recognition terms inside the display area (e.g. "Ikusabata" to "Inaginaganuma") are respectively weighted with weighted values more than 1.0, while all of the objective recognition terms outside the display area are respectively weighted with weighted values of 1.0. To the contrary, as shown in FIG. 8, all of the objective recognition terms inside the display area are respectively weighted with weighted values more than 1.0. For the other objective recognition terms outside the display area, each of those weighted values is gradually reduced from the weighted value established for each objective recognition term in the display area to 1.0 finally as the objective recognition term is apart from the display area.

Consequently, there is no need that the user grasps the display area precisely. For example, when the user wants to change the display area in the destination detecting picture as shown in FIG. 5, the user has only to manipulate the joy stick 4a in a manner that the display area roughly approaches the desired objective recognition term. In this case, even if the desired objective recognition term is outside the display area, it is possible to enhance a probability that the desired objective recognition term is recognized as one of the highest-ranking objective recognition terms openly. In comparison with the first embodiment where the probability for recognition could not be enhanced unless displaying the desired objective recognition term on the monitor 1a certainly, it is possible to lighten the user's burden in setting the display area.

3RD. EMBODIMENT

In the first embodiment mentioned before, on condition that the objective recognition terms inside the display area are weighted heavier than the objective recognition terms outside the display area, the degrees of agreement of the objective recognition terms are multiplied by the so-established weighted values and further three objective recognition terms having the first, second and third largest degrees (scores) of agreement are selected and displayed on the monitor 1a finally. To the contrary, according to the third embodiment of the invention, if the three highest-ranking objective recognition terms on display do not include any one of the objective recognition terms outside the display area, it is executed to extract an objective recognition term having the first highest degree (score) of agreement from the objective recognition terms outside the display area after weighting and further executed to replace the third highest objective recognition term inside the display area with the so-extracted first highest objective recognition term.

Consequently, it is possible to avoid the occurrence of a situation that although there exits an objective recognition term that agrees with the user's voices (words) outside the display area, such an objective recognition terms is not included in the group of top-three objective terms after weighting due to unclearness in the user's vocalization. That is, in spite of the user's unclear vocalization, it is possible to enhance a probability that the objective recognition term corresponding to the user's voices is included in the group of objective recognition terms selected finally, thereby improving the recognition rate.

In more detail, when the user utters a term containing an unnecessary word, for example, "Oh! Kameari", under a situation of displaying the destination selecting picture as shown in FIG. 5, there might arise a possibility that the term "Kameari" is not included in the final selection result as shown in FIG. 6 since the term uttered by the user begins from "Oh!" To the contrary, according to the third embodiment, it is possible to enhance a possibility that the term "Kameari" is included in the final selection result.

Note, the structure of the voice recognition device embodying the third embodiment is similar to that of the first embodiment and therefore, the descriptions about the structure are eliminated. Additionally, besides the method of selecting the top-three highest objective recognition terms after weighting, the operation of the third embodiment is similar to that of the first embodiment of the invention and the descriptions are eliminated as well.

4TH. EMBODIMENT

In the first embodiment mentioned before, the weighted value on the objective recognition term is determined by whether it is included in the display area. While, according to the fourth embodiment, there is not carried out a weighting for the objective recognition terms.

In this embodiment, without weighting the objective recognition terms, it is executed to select the top-three highest objective recognition terms as a result of collating the objective recognition terms with the user's voices and further confirm whether or not the so-selected terms are formed by the objective recognition term(s) inside the display area and also the objective recognition term(s) outside the display area. If the so-selected terms are not formed by the objective recognition terms inside and outside the display area, in other words, the top-three highest terms consist of the objective recognition terms all included in the display area or all excluded therefrom, then it is carried out to extract the highest objective recognition term in the objective recognition terms besides the so-selected top-three highest objective recognition terms and further replace the third highest objective recognition term in the top-three highest objective recognition terms with the so-extracted highest objective recognition term.

Consequently, it is possible to avoid the occurrence of a phenomenon that a user has a sense of incompatibility that although an objective recognition term corresponding to the user's voices is actually displayed, the same objective recognition term is not selected finally. Thus, even if the user's vocalization is too unclear to pick up, a probability that the objective recognition term corresponding to the user's vocalization is included in the group of objective recognition terms selected finally can be enhanced to improve the recognition rate.

Also noted, the structure of the voice recognition device embodying the fourth embodiment is similar to that of the first embodiment of FIGS. 1 and 2 and therefore, the descriptions about the structure are eliminated. Additionally, besides the method of selecting the top-three highest objective recognition terms after weighting, the operation of the fourth embodiment is similar to that of the first embodiment of the invention and the descriptions are eliminated as well.

5TH. EMBODIMENT

The fifth embodiment of the present invention will be described below. According to the embodiment, the objective recognition terms inside the display area are weighted heavier than those outside the display area only when the user changes the contents (objective recognition terms) in the display area in advance of the user's manipulating by voices recognition. Note, the structure of the voice recognition device embodying the fifth embodiment is similar to that of the first embodiment of FIGS. 1 and 2 and therefore, the descriptions about the structure are eliminated.

Figure 9:
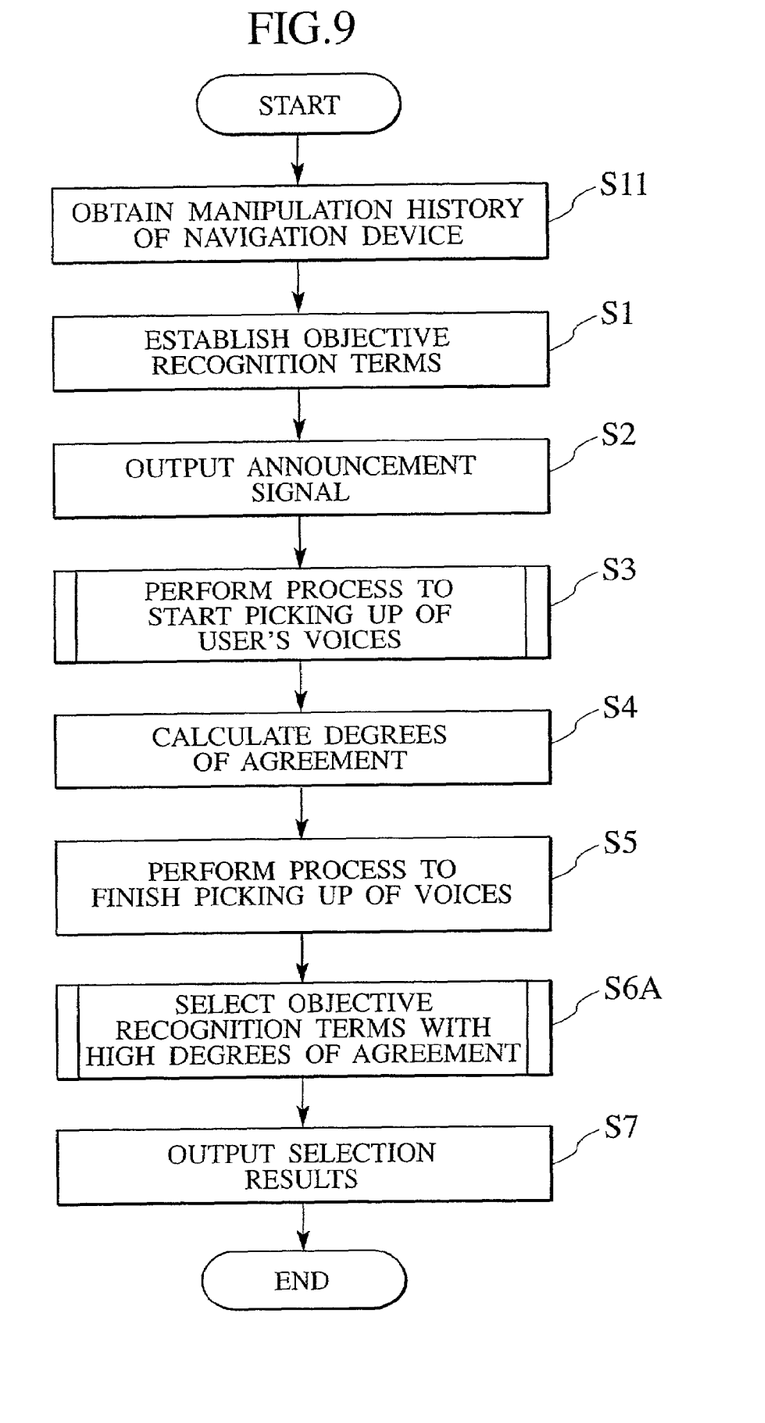
FIG. 9 is a flow chart showing the voice recognition program of the fifth embodiment of the invention.

FIG. 9 is a flow chart of the voice recognition program in accordance with the fifth embodiment. In this flow chart, steps for executing operations similar to those at steps in the flow chart of FIG. 3 are indicated with the same step numbers respectively and their overlapping descriptions will be eliminated.

At step S11, it is executed to obtain the manipulating history of the navigation unit 1. Then, the history of manipulations of a predetermined number are obtained by looking back the user's manipulation of the voicing/cancel switch 4b. When the display area has been changed by the user's manipulating the joy stick 4a, there are remained both manipulation (manipulation of the joy stick 4a) and result (change in display area) as the manipulating history. The signal processing unit 2c stores the manipulating history in the memory 2b.

Thereafter, the respective operations at steps S1 to S5 (FIG. 3) of the first embodiment are carried out. Next, at step S6A after completing the calculation of degrees of agreement, it is executed to confirm the manipulation contents before manipulating the voicing/cancel switch 4b from the manipulating history stored in the memory 2b. When there is a record that the manipulation to change the display area was carried out before manipulating the voicing/cancel switch 4b, the objective recognition terms inside the display area are weighted with a weighted value more than 1.0 each, while the objective recognition terms outside the display area are respectively weighted with a weighted value of 1.0 each, as mentioned in the first embodiment. Next, it is executed to multiply the degrees of agreement of the respective objective recognition terms by the so-established weights and continuously select the top-three high-ranking objective recognition terms from the objective recognition terms after weighting. On the other hand, if the manipulation to change the display area has not been carried out before manipulating the voicing/cancel switch 4, then it is carried out not to weight the objective recognition terms but select the top-three high-ranking objective recognition terms having the first, second and third degrees of agreement from all of the objective recognition terms inside and outside the display area.

According to the fifth embodiment, only when the user utters words after displaying a desired objective term on the monitor 1a, the objective recognition terms inside the display area are weighted heavier than the objective recognition terms outside the display area thereby to improve the recognition rate against the objective recognition terms inside the display area. Conversely, if the user utters words without performing a manipulation to display the desired objective term on the monitor 1a, it is carried out not to weight the objective recognition terms inside the display area but to handle all of the objective recognition terms inside and outside the display area evenly. Consequently, as the user utters words after displaying the desired objective recognition terms on the monitor 1a, a high recognition rate is accomplished, whereby it is possible to satisfy the user who dares to do a troublesome manipulation sufficiently.

6TH. EMBODIMENT

The sixth embodiment of the present invention will be described below. According to the embodiment, the objective recognition terms inside the display area are weighted heavier than those outside the display area only when the user changes the contents (objective recognition terms) in the display area big and subsequently small and thereafter, the user manipulates the device by voice recognition. Note, the structure of the voice recognition device embodying the sixth embodiment is similar to that of the first embodiment of FIGS. 1 and 2 and therefore, the descriptions about the structure are eliminated.

The operation of the sixth embodiment only differs from the operation of the fifth embodiment of FIG. 9 in a part of process at step 6A and therefore, the illustration is eliminated.

Next, at step S6A after completing the calculation of degrees of agreement, it is executed to confirm the manipulation contents before manipulating the voicing/cancel switch 4b from the manipulating history stored in the memory 2b. If there is a record that a big change for the display area and a sequent small change were carried out before manipulating the voicing/cancel switch 4b, the objective recognition terms inside the display area are weighted with a value more than 1.0 each, while the objective recognition terms outside the display area are respectively weighted with a value of 1.0 each, as mentioned in the first embodiment. Next, it is executed to multiply the degrees of agreement of the respective objective recognition terms by the so-established weights and continuously select the top-three high-ranking objective recognition terms from the objective recognition terms after weighting. On the other hand, if there is no change for the display area before manipulating the voicing/cancel switch 4, then the top-three high-ranking objective recognition terms having the first, second and third degrees of agreement are selected from all of the objective recognition terms inside and outside the display area, without weighting the objective recognition terms.

In this embodiment, for example, such a change that all of the objective recognition terms inside the display area are replaced at one time is defined as a big change, while such a change that the objective recognition terms inside the display area are partially replaced is defined as a small change.

According to the embodiment, it is possible to accomplish a sufficiently-high recognition rate which is satisfactory to the user who dares to do a troublesome operation of displaying the desired objective recognition terms on the monitor 1a and subsequently uttering words.

7TH. EMBODIMENT

The seventh embodiment of the present invention will be described below. According to the embodiment, only when the user changes the contents (objective recognition terms) in the display area in advance of the user's manipulating by voices recognition, the objective recognition terms inside the display area are weighted heavier than those outside the display area in accordance with the changing direction of the display area. Note, the structure of the voice recognition device embodying the seventh embodiment is similar to that of the first embodiment of FIGS. 1 and 2 and therefore, the descriptions about the structure are eliminated.

The operation of the seventh embodiment only differs from the operation of the fifth embodiment of FIG. 9 in a part of process at step 6A and therefore, the illustration is eliminated.

Figure 10:
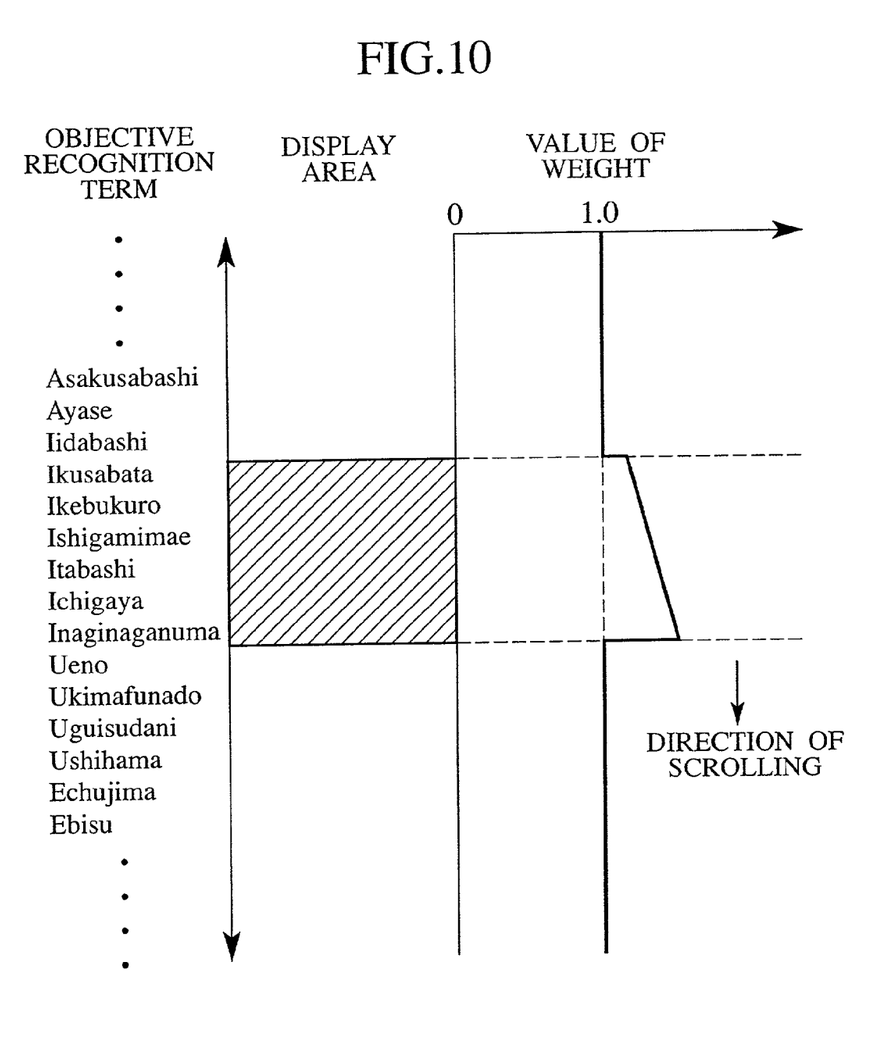
FIG. 10 is a diagram for explanation of the method of weighting objective recognition terms of the seventh embodiment of the invention.

Next, at step S6A after completing the calculation of degrees of agreement, it is executed to confirm the manipulation contents before manipulating the voicing/cancel switch 4b from the manipulating history stored in the memory 2b. If there is a record that an operation to change the display area was carried out before manipulating the voicing/cancel switch 4b, the objective recognition terms inside the display area are weighted with a value more than 1.0 each. Further, as shown in FIG. 10, the objective recognition terms inside the display area are weighted to be gradually heavy along a direction to scroll the display area by the joy stick 4a, that is, a direction to change the display area. The objective recognition terms outside the display area are respectively weighted with a value of 1.0 each, as similar to the first embodiment. Next, it is executed to multiply the degrees of agreement of the respective objective recognition terms by the so-established weights and continuously select the top-three high-ranking objective recognition terms from the objective recognition terms after weighting. On the other hand, if there is no change for the display area before manipulating the voicing/cancel switch 4, then the top-three high-ranking objective recognition terms having the first, second and third degrees of agreement are selected from all of the objective recognition terms inside and outside the display area, without weighting the objective recognition terms.

Figure 11:
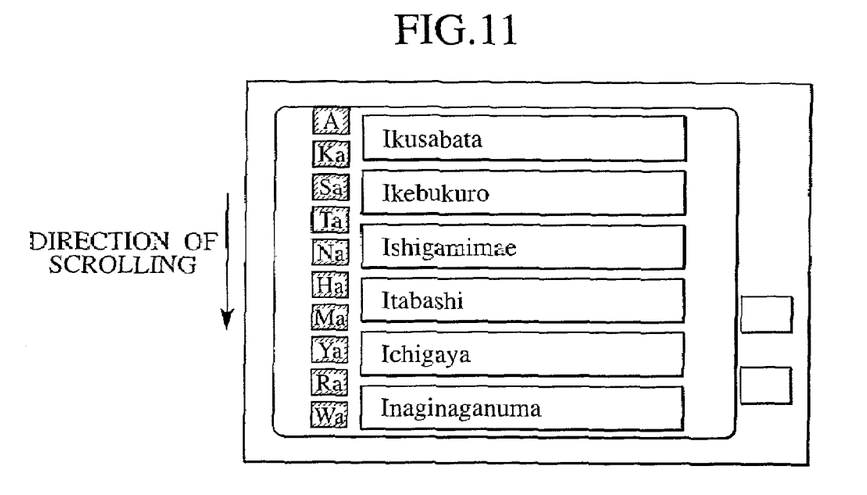
FIG. 11 is a view for explanation of the situation at the time of scrolling a picture displaying various destinations.

It should be noted that, under a situation that the user is manipulating the joy stick 4a to successively change (scroll) the contents (objective recognition terms) in the display area as shown in FIG. 11, if the desired objective recognition term appears in the display area, the user will stop the scrolling operation immediately. Owing to such a tendency of the user, it will be understood that either the destination (objective recognition term) that has appeared in the latest or another objective recognition term in the vicinity of the latest objective recognition term has a strong likelihood of the desired objective recognition term. Therefore, according to this embodiment, it is established that the objective recognition term on the upstream side in a direction to change the contents in the display area has a heavy weight in comparison with a weight of the objective recognition term on the downstream side in the direction to change the contents in the display area. In other words, it is carried out to weight the objective recognition terms in the display area in order of the objective recognition terms that have appeared in the display area. In this view, the latest objective recognition term in the display area is established to have the largest weighted value. In the display area of FIG. 11, since a term "Ichigaya" as the destination (i.e. a desired objective recognition term) is positioned in the vicinity of the latest objective recognition term (e.g. "Inaginaganuma") at the time of stopping the scroll operation, the objective recognition term "Ichigaya" is established to have a relatively-heavy weight in comparison with the other objective recognition terms in the display area. Therefore, it is possible to enhance a possibility that this objective recognition term appears in the next-coming display (see FIG. 6) as the result of recognition.

8TH. EMBODIMENT

The eighth embodiment of the present invention will be described below. According to the embodiment, only when the user changes the contents (objective recognition terms) in the display area in advance of the user's manipulating by voices recognition, it is established that the objective recognition terms inside the display area are weighted heavier than those outside the display area and additionally, the weighted value of each objective recognition term outside the display area is gradually reduced as the position of the objective recognition term in arrangement is apart from the display area. Note, the structure of the voice recognition device embodying the eighth embodiment is similar to that of the first embodiment of FIGS. 1 and 2 and therefore, the descriptions about the structure are eliminated.

Similarly to the seventh embodiment, the operation of the eighth embodiment only differs from the operation of the fifth embodiment of FIG. 9 in a part of process at step 6A and therefore, the illustration is eliminated.

Figure 12:
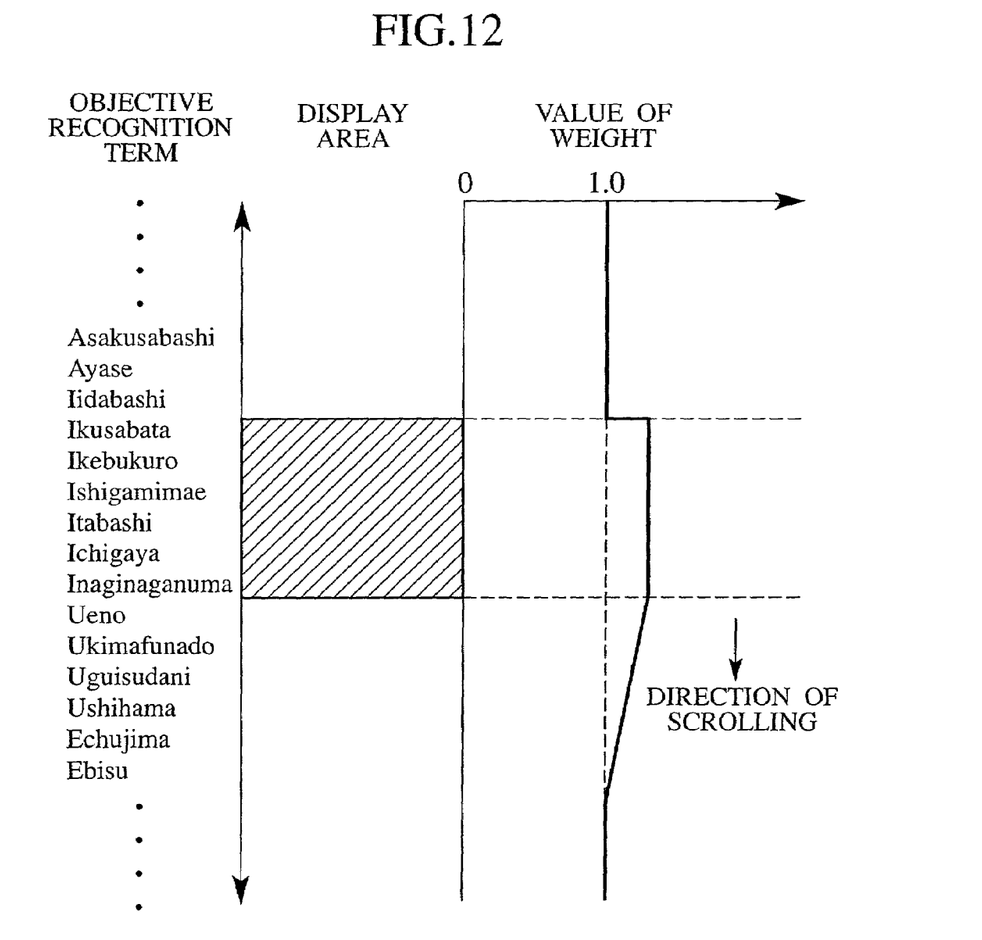
FIG. 12 is a diagram for explanation of the method of weighting objective recognition terms of the eighth embodiment of the invention.

Next, at step S6A after completing the calculation of degrees of agreement, it is executed to confirm the manipulation contents before manipulating the voicing/cancel switch 4*b* from the manipulating history stored in the memory 2*b*. If there is a record that an operation to change the display area was carried out before manipulating the voicing/cancel switch 4*b*, the objective recognition terms inside the display area are weighted with a value more than 1.0 each. Further, as shown in FIG. 12, each of the objective recognition terms outside the display area is weighted to become gradually light as the position of the objective recognition term is apart from the display area along a direction to scroll the display area by the joy stick 4*a*, that is, a direction to change the display area. The final weighted value of the objective recognition terms outside the display area becomes equal to 1.0. Then, it is executed to multiply the degrees of agreement of the respective objective recognition terms by the so-established weights and continuously select the top-three high-ranking objective recognition terms from the objective recognition terms after weighting. On the other hand, if there is no change for the display area before manipulating the voicing/cancel switch 4, then the top-three high-ranking objective recognition terms having the first, second and third degrees of agreement are selected from all of the objective recognition terms inside and outside the display area, without weighting the objective recognition terms.

It should be noted that, under a condition that a number of objective recognition terms, such as regions and stations, are arranged in a prescribed order (e.g. the Japanese syllabary), the user performs a so-called "scroll play" to successively change the present picture to another picture in a direction where the desired objective recognition term at which the user aims is believed to be in existence, by means of joy stick, directional key, etc. Then, the probability is high that the desired objective recognition term is in existence ahead of the "scroll" direction, while the probability is low that the desired objective recognition term is in existence ahead of the opposite direction to the "scroll" direction. Therefore, according to the eighth embodiment, the weighted value of each objective recognition term outside the display area, which are present ahead of the "scroll" direction, is gradually reduced toward the final value of 1.0 as the position of the objective recognition term is apart from the display area. On the other hand, the objective recognition terms which have already passed the display area due to the user's scroll play are weighted with a value of 1.0 each since these objective recognition terms are regarded as each having a low probability of the desired objective recognition term that the user aims. In this way, it is possible to increase a probability that the desired objective recognition term is recognized.

In common with the above-mentioned embodiments, it is noted that the microphone 5 corresponds to a voice pickup unit of the invention. Similarly, the outside memory unit 2*h* corresponds to a memory unit of the invention, the monitor 1*a* a display unit of the invention, and the CPU 2*a* of the voice input unit 2 forms a weighting unit, a calculating unit, a changing unit, an extracting unit and a replacing unit of the invention.

Finally, it will be understood by those skilled in the art that the foregoing descriptions are nothing but some embodiments of the disclosed voice recognition device. Besides these embodiments, various changes and modifications may be made to the present invention without departing from the spirit and scope of the invention.

Japanese Patent Application Serial No. 2001-77910 is expressly incorporated herein by reference in its entirety.

The scope of the invention is defined with reference to the following claims.

What is claimed is:

1. A voice recognition device comprising:
   a voice pickup unit configured to pick up voices of a user;
   a memory unit configured to store a plurality of objective recognition terms;
   a display unit configured to display a predetermined number of objective recognition terms that are included in the plurality of objective recognition terms stored in the memory unit;
   a weighting unit configured to weight the objective recognition terms on the display unit with respective weighted values, each of the respective weighted values being larger than weighted values of the other objective recognition terms that are not displayed on the display unit; and
   a calculating unit configured to calculate respective degrees of agreement between the objective recognition terms after being weighted by the weighting unit and the user's voices being picked up by the voice pickup unit, wherein:
the user's voices are recognized based on the degrees of agreement calculated by the calculating unit,
the memory unit stores the plurality of objective recognition terms in a prescribed order,
the display unit displays the objective recognition terms in a display area adapted to display the objective recognition terms of a predetermined number in the prescribed order, and
the weighting unit operates to weight the objective recognition terms outside the display area such that each of the weighted values of the objective recognition terms outside the display area is gradually reduced from the weighted values of the objective recognition terms in the display area as a position of a respective objective recognition term outside the display area is apart from the display area.

2. The voice recognition device of claim 1, further comprising a changing unit configured to change contents in the display area, wherein
the weighting unit operates to weight the objective recognition terms in the display area with weighted values, each of the weighted values of the objective recognition terms in the display area is larger than weighted values of the other objective recognition terms outside the display area only when the contents in the display area is changed by the changing unit.

3. The voice recognition device of claim 1, further comprising a changing unit configured to change contents in the display area,
wherein the weighting unit operates to weight the objective recognition terms in the display area with weighted values, each of the weighted values of the objective recognition terms in the display area is larger than weighted values of the other objective recognition terms outside the display area only when a small change in the contents in the display area is carried out after completing a big change in the contents in the display area by the changing unit.

4. The voice recognition device of claim 1, further comprising a changing unit configured to change contents in the display area,
wherein the weighting unit operates to weight the objective recognition terms in the display area in an order of the objective recognition terms that have appeared in the display area as a result of changing the contents in the display area by the changing unit, whereby the latest objective recognition term in the display is weighted with the largest weighted value.

5. The voice recognition device of claim 1, further comprising a changing unit configured to change contents in the display area,
wherein the weighting unit operates to weight the objective recognition terms in the display area with weighted values, each of the weighted values of the objective recognition terms in the display area is larger than weighted values of the other objective recognition terms outside the display area, and further operates to weight each of the objective recognition terms that are arranged outside the display area in a direction to change the contents in the display area, with a weighted value that is reduced from the weighted values of the objective recognition terms in the display area gradually as separating from the display area.

6. A voice recognition device comprising:
a voice pickup unit configured to pick up voices of a user;
a memory unit configured to store a plurality of objective recognition terms;
a display unit configured to display in a display area a predetermined number of objective recognition terms that are included in the plurality of objective recognition terms stored in the memory unit;
a weighting unit configured to weight the objective recognition terms on the display unit with respective weighted values, each of the respective weighted values being larger than weighted values of the other objective recognition terms not displayed on the display unit;
a calculating unit configured to calculate respective degrees of agreement between the objective recognition terms after being weighted by the weighting unit and the user's voices being picked up by the voice pickup unit, wherein the users s voices are recognized based on the degrees of agreement calculated by the calculating unit;
an extracting unit configured to extract another predetermined number of objective recognition terms from the objective recognition terms, in an order of respective degrees of agreement, wherein the objective recognition terms extracted by the extracting unit are displayed on the display unit to allow the final objective recognition term desired by the user to be selected; and
a replacing unit configured to replace the objective recognition term having the lowest degree of agreement in the extracted objective recognition terms with the objective recognition term arranged outside the display area having the highest degree of agreement when any one of the objective recognition terms outside the display area is not included in a group of the extracted objective recognition terms extracted by the extracting unit.

* * * * *

UNITED STATES PATENT AND TRADEMARK OFFICE
CERTIFICATE OF CORRECTION

| | |
|---|---|
| PATENT NO. | : 7,076,425 B2 |
| APPLICATION NO. | : 10/087980 |
| DATED | : July 11, 2005 |
| INVENTOR(S) | : Takeshi Ono et al. |

It is certified that error appears in the above-identified patent and that said Letters Patent is hereby corrected as shown below:

On the title page of the Letters Patent,

Under section "(73) Assignee", change " Nissam Motot Co., Ltd., " to -- Nissan Motor Co., Ltd., --

Signed and Sealed this

Twenty-eighth Day of August, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,076,425 B2 |
| APPLICATION NO. | : 10/087980 |
| DATED | : July 11, 2006 |
| INVENTOR(S) | : Takeshi Ono et al. |

Page 1 of 1

It is certified that error appears in the above-identified patent and that said Letters Patent is hereby corrected as shown below:

On the title page of the Letters Patent,

Under section "(73) Assignee", change " Nissam Motot Co., Ltd., " to -- Nissan Motor Co., Ltd., --

This certificate supersedes Certificate of Correction issued August 28, 2007.

Signed and Sealed this

Twenty-fifth Day of September, 2007

JON W. DUDAS
*Director of the United States Patent and Trademark Office*